US012572474B2

(12) United States Patent
Donley et al.

(10) Patent No.: US 12,572,474 B2
(45) Date of Patent: Mar. 10, 2026

(54) SPARSITY COMPRESSION FOR INCREASED CACHE CAPACITY

(71) Applicant: Advanced Micro Devices, Inc., Santa Clara, CA (US)

(72) Inventors: Gregg Donley, Santa Clara, CA (US); Chintan S. Patel, Austin, TX (US); Vydhyanathan Kalyanasundharam, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 138 days.

(21) Appl. No.: 18/090,261

(22) Filed: Dec. 28, 2022

(65) Prior Publication Data

US 2025/0209005 A1 Jun. 26, 2025

(51) Int. Cl.
*G06F 3/00* (2006.01)
*G06F 12/00* (2006.01)
*G06F 12/0853* (2016.01)
*G06F 12/0864* (2016.01)

(52) U.S. Cl.
CPC ...... *G06F 12/0864* (2013.01); *G06F 12/0853* (2013.01)

(58) Field of Classification Search
CPC .......................... G06F 12/0864; G06F 12/0853
USPC .......................................................... 711/128
See application file for complete search history.

(56) References Cited

U.S. PATENT DOCUMENTS

| | | | | |
|---|---|---|---|---|
| 5,835,963 | A * | 11/1998 | Yoshioka | G11C 29/24 |
| | | | | 711/E12.063 |
| 5,930,832 | A * | 7/1999 | Heaslip | G06F 12/1054 |
| | | | | 712/216 |
| 6,018,763 | A * | 1/2000 | Hughes | H04L 49/90 |
| | | | | 709/213 |
| 6,768,739 | B1 * | 7/2004 | Kobayashi | H04L 45/742 |
| | | | | 370/395.31 |
| 6,778,181 | B1 * | 8/2004 | Kilgariff | G06T 15/005 |
| | | | | 345/582 |
| 6,850,243 | B1 * | 2/2005 | Kilgariff | G06T 15/04 |
| | | | | 345/581 |
| 6,919,904 | B1 * | 7/2005 | Kilgariff | G06T 15/50 |
| | | | | 345/428 |
| 7,904,657 | B2 * | 3/2011 | Shen | G06F 12/0831 |
| | | | | 711/119 |
| 9,430,164 | B1 * | 8/2016 | Botelho | G06F 11/14 |
| 10,204,046 | B1 * | 2/2019 | Peer | G06F 12/0802 |
| 10,303,622 | B2 * | 5/2019 | Balasubramonian | G06F 3/064 |
| 10,452,316 | B2 * | 10/2019 | Lomelino | H04L 12/4633 |
| 10,620,861 | B2 * | 4/2020 | Balasubramonian | G06F 3/064 |
| 10,901,660 | B1 * | 1/2021 | Frandzel | G06F 3/0673 |
| 11,507,519 | B2 * | 11/2022 | Kotra | G06F 12/0891 |
| 11,615,320 | B1 * | 3/2023 | Hung | G06F 16/284 |
| | | | | 706/15 |
| 11,651,283 | B1 * | 5/2023 | Liu | G06N 3/0464 |
| | | | | 706/12 |

(Continued)

*Primary Examiner* — Sheng Jen Tsai
(74) *Attorney, Agent, or Firm* — Greenberg Traurig, LLP

(57) ABSTRACT

The disclosed computer-implemented method includes configuring a cache with a cache addressing scheme that increases a capacity of each entry of the cache, compressing a data segment for storing in the cache, and storing metadata of the compression in the cache with the compressed data segment. Various other methods, systems, and computer-readable media are also disclosed.

19 Claims, 6 Drawing Sheets

300

370   362   364

0  0  0  1  1  1  1  1  0  0  1  1  1  1  0  0

372

356

0001111100111100

(56)                References Cited

U.S. PATENT DOCUMENTS

| | | | |
|---|---|---|---|
| 11,676,068 B1* | 6/2023 | Zimmer | G06N 3/0464 |
| | | | 706/12 |
| 11,687,831 B1* | 6/2023 | Hung | G06N 20/00 |
| | | | 706/12 |
| 11,823,018 B1* | 11/2023 | Hung | G06N 3/063 |
| 11,842,423 B2* | 12/2023 | Appu | G06F 9/3836 |
| 12,056,059 B2* | 8/2024 | Koker | G06F 12/0891 |
| 12,093,210 B2* | 9/2024 | Appu | G06F 12/0882 |
| 12,124,383 B2* | 10/2024 | Koker | G06F 12/123 |
| 2005/0182907 A1* | 8/2005 | Shen | G06F 12/0831 |
| | | | 711/146 |
| 2011/0004720 A1* | 1/2011 | Chiang | G06F 12/0246 |
| | | | 711/E12.001 |
| 2012/0137079 A1* | 5/2012 | Ueda | G06F 12/1036 |
| | | | 711/141 |
| 2012/0198121 A1* | 8/2012 | Bell, Jr. | G06F 12/1036 |
| | | | 711/3 |
| 2015/0067264 A1* | 3/2015 | Eckert | G06F 12/126 |
| | | | 711/133 |
| 2015/0269180 A1* | 9/2015 | Chen | H03M 7/6005 |
| | | | 707/693 |
| 2016/0041905 A1* | 2/2016 | Turner | G06F 12/0886 |
| | | | 711/3 |
| 2016/0154739 A1* | 6/2016 | Jung | G09G 5/395 |
| | | | 711/118 |
| 2016/0188486 A1* | 6/2016 | Sohi | G06F 12/0802 |
| | | | 711/118 |
| 2016/0196210 A1* | 7/2016 | Noguchi | G06F 12/0811 |
| | | | 711/122 |
| 2016/0321182 A1* | 11/2016 | Grubisic | G06F 12/1027 |
| 2016/0335188 A1* | 11/2016 | Romanovskiy | G06F 12/0246 |
| 2016/0371190 A1* | 12/2016 | Romanovskiy | G06F 3/0659 |
| 2017/0004069 A1* | 1/2017 | Li | G06F 12/08 |
| 2017/0220488 A1* | 8/2017 | Balasubramonian | |
| | | | G06F 11/1012 |
| 2017/0286215 A1* | 10/2017 | Gerhard | G06F 3/0689 |
| 2017/0286220 A1* | 10/2017 | Gerhard | G06F 11/1096 |
| 2017/0364307 A1* | 12/2017 | Lomelino | G06F 3/0659 |
| 2017/0371786 A1* | 12/2017 | Srinivasan | G06F 12/0846 |
| 2018/0089091 A1* | 3/2018 | Akenine-Moller | |
| | | | G06F 12/0875 |
| 2018/0089094 A1* | 3/2018 | Clancy | G06F 12/1063 |
| 2018/0165213 A1* | 6/2018 | Bernat | G06F 12/0822 |

| | | | |
|---|---|---|---|
| 2018/0192100 A1* | 7/2018 | Urata | H04N 21/64322 |
| 2018/0349291 A1* | 12/2018 | Klingauf | G06F 12/12 |
| 2019/0034349 A1* | 1/2019 | Mcavoy | G06F 12/0891 |
| 2019/0043583 A1* | 2/2019 | Majumder | G11C 15/04 |
| 2019/0155736 A1* | 5/2019 | Hagersten | G06F 12/0811 |
| 2020/0159438 A1* | 5/2020 | Meredith | G06F 3/0605 |
| 2020/0242049 A1* | 7/2020 | Loh | G06F 12/0808 |
| 2020/0250101 A1* | 8/2020 | Patsilaras | H03M 7/30 |
| 2021/0011800 A1* | 1/2021 | Chen | G06F 3/0653 |
| 2021/0035258 A1* | 2/2021 | Ray | G06F 9/30036 |
| 2021/0056036 A1* | 2/2021 | Breslow | G06F 12/0886 |
| 2021/0089470 A1* | 3/2021 | Hao | G06F 12/1027 |
| 2021/0149819 A1* | 5/2021 | Kotra | G06F 12/1027 |
| 2021/0165739 A1* | 6/2021 | Srinivasan | G06F 12/0817 |
| 2021/0195213 A1* | 6/2021 | Zhang | H04N 19/172 |
| 2021/0200771 A1* | 7/2021 | Kuang | G06F 16/24552 |
| 2021/0258592 A1* | 8/2021 | Surti | G06T 15/503 |
| 2022/0084156 A1* | 3/2022 | Kothandaraman | G06F 9/3851 |
| 2022/0100603 A1* | 3/2022 | Li | G06F 3/0656 |
| 2022/0129521 A1* | 4/2022 | Surti | G06F 15/173 |
| 2022/0164138 A1* | 5/2022 | Yang | G06F 3/0659 |
| 2022/0188276 A1* | 6/2022 | Ben Dayan | G06F 3/0643 |
| 2022/0350751 A1* | 11/2022 | Koker | G06F 12/126 |
| 2023/0090973 A1* | 3/2023 | Ray | G06F 13/1668 |
| | | | 711/137 |
| 2023/0102538 A1* | 3/2023 | Ray | G06T 1/20 |
| | | | 345/522 |
| 2023/0104845 A1* | 4/2023 | Ray | G06F 7/08 |
| | | | 711/126 |
| 2023/0143760 A1* | 5/2023 | Kelley | G06F 12/0868 |
| 2023/0195628 A1* | 6/2023 | Arunkumar | G06F 13/1642 |
| | | | 711/121 |
| 2023/0297508 A1* | 9/2023 | Zirr | G06F 12/0837 |
| | | | 711/128 |
| 2023/0298126 A1* | 9/2023 | Woop | G06T 15/06 |
| | | | 345/557 |
| 2023/0298127 A1* | 9/2023 | Barczak | G06T 1/60 |
| | | | 345/531 |
| 2023/0298254 A1* | 9/2023 | Benthin | G06T 15/06 |
| | | | 345/418 |
| 2023/0298255 A1* | 9/2023 | Benthin | G06T 15/06 |
| | | | 345/426 |
| 2023/0306551 A1* | 9/2023 | Krishnan | G06T 9/00 |
| 2023/0350641 A1* | 11/2023 | Tessari | G06F 7/582 |
| 2024/0111425 A1* | 4/2024 | Kotra | G06F 12/0815 |
| 2024/0127527 A1* | 4/2024 | Smith-Lacey | G06T 15/06 |

* cited by examiner

Processor
210

Core
212A

Core
212B

L1
214A

L1
214B

L2
216A

L2
216B

L3
218

Accelerator
211

Chiplet
213A

Chiplet
213B

Chiplet
213C

Chiplet
213D

L2
217

Data Fabric
240

Memory Cache
230

Memory
220

Memory Cache
230

Memory
220

200

Method
600

Start

Configure a cache with a cache addressing scheme that increases a
capacity of each entry of the cache
602

Compress a data segment for storing in the cache
604

Store metadata of the compression in the cache with the
compressed data segment
606

End

SPARSITY COMPRESSION FOR INCREASED CACHE CAPACITY

BACKGROUND

Processors read and write data and/or instructions from memory devices. Unfortunately, increasing memory sizes and processing speeds often create bottlenecks when accessing memory. A cache is a faster but smaller memory for storing data that is repeatedly accessed in order to reduce memory accesses. Although larger caches are often desirable, physical and other design considerations limit the physical storage capacity of caches. Thus, cache capacity can be limited by practical physical constraints.

BRIEF DESCRIPTION OF THE DRAWINGS

The accompanying drawings illustrate a number of exemplary implementations and are a part of the specification. Together with the following description, these drawings demonstrate and explain various principles of the present disclosure.

Figure 1:
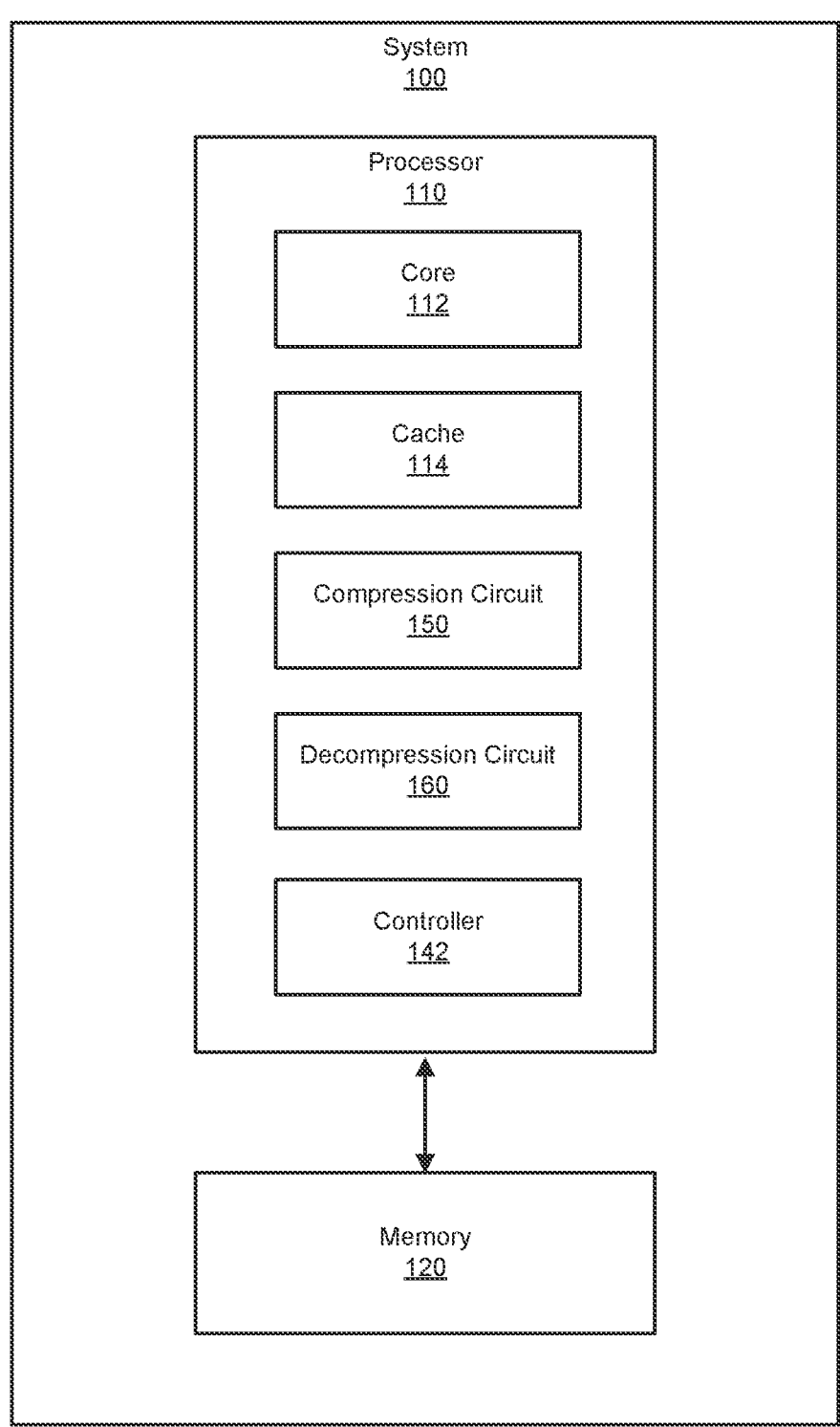
FIG. 1 is a block diagram of an exemplary system for sparsity compression for increased cache capacity.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION

The present disclosure is generally directed to increasing cache capacity by implementing data compression. As will be explained in greater detail below, implementations of the present disclosure incorporate data compression to allow more data to be stored in the same physical storage space. In addition, the systems and methods described herein can improve the functioning of the computer itself by increasing cache capacity without significant overhead, allowing for improved cache performance and reduced memory accesses.

As will be described in greater detail below, the instant disclosure describes various systems and methods for updating a cache addressing scheme to allow storing more data, compressing data, and storing the compressed data along with corresponding metadata of the compression.

In one example, a device for sparsity compression for increased cache capacity includes a cache and a controller configured to configure a cache with a cache addressing scheme that increases a capacity of each entry of the cache, compress a data segment for storing in the cache, and store metadata of the compression in the cache with the compressed data segment.

In some examples, compressing the data segment further comprises shifting non-zero values together. In some examples, the metadata represents index locations for zero values in the data segment. In some examples, the metadata comprises a bitmask of the index locations. In some examples, the metadata is appended to the compressed data segment for storing in the cache.

In some examples, the cache addressing scheme includes hashing one or more address bits to increase a number of addresses represented by each entry of the cache. In some examples, the address bits correspond to upper address bits. In some examples, the cache addressing scheme includes reconfiguring a shadow tag indexing scheme for the cache.

In some examples, the controller is also configured to decompress, using the metadata, the compressed data segment for reading. In some examples, decompressing the compressed data segment further comprises applying the metadata to shift non-zero values in the compressed data segment to locations corresponding to the data segment prior to compression.

In one implementation, a system for sparsity compression for increased cache capacity includes a cache, a compression circuit, and a controller configured to configure the cache with a cache addressing scheme that increases a capacity of each entry of the cache, compress a data segment for storing in the cache, append metadata of the compression to the compressed data segment, and store the compressed data segment and the metadata in a cache entry.

In some examples, the compression circuit comprises a zero detect circuit and a shift logic. In some examples, compressing the data segment further comprises detecting, using the zero detect circuit, index locations for zero values in the data segment, saving, as a bitmask, the index locations as the metadata, and shifting, using the shift logic, non-zero values together.

In some examples, the cache addressing scheme comprises hashing one or more upper address bits to increase a number of addresses represented by each entry of the cache and reconfiguring a shadow tag indexing scheme for the cache.

In some examples, the controller is further configured to decompress, by applying the metadata to shift non-zero values in the compressed data segment to locations corresponding to the data segment prior to compression, the compressed data segment for reading.

In one implementation, a method for sparsity compression for increased cache capacity includes configuring a cache with a cache addressing scheme that increases a capacity of each entry of the cache, compressing, using a compression circuit, a data segment for storing in the cache, storing metadata of the compression in the cache with the compressed data segment, and decompressing, using a decompression circuit, the compressed data segment for reading the data segment.

In some examples, the compression circuit comprises a zero detect circuit and a first shift logic, and the decompression circuit comprises a second shift logic. In some examples, compressing the data segment further comprises shifting, using the first shift logic, non-zero values together, and decompressing the compressed data segment further comprises applying the metadata to shift, using the second shift logic, non-zero values in the compressed data segment to locations corresponding to the data segment prior to compression.

In some examples, the metadata comprises a bitmask of index locations detected by the zero detect unit for zero values in the data segment. In some examples, the metadata is appended to the compressed data segment for storing in the cache.

In some examples, the cache addressing scheme includes hashing one or more upper address bits to increase a number of addresses represented by each entry of the cache and reconfiguring a shadow tag indexing scheme for the cache.

Features from any of the implementations described herein can be used in combination with one another in accordance with the general principles described herein. These and other implementations, features, and advantages will be more fully understood upon reading the following detailed description in conjunction with the accompanying drawings and claims.

The following will provide, with reference to FIGS. 1-6, detailed descriptions of systems and method for sparsity compression to increase cache capacity. Detailed descriptions of example systems for increased cache capacity using sparsity compression will be provided in connection with FIGS. 1 and 2. Detailed descriptions of an example sparsity compression scheme will be provided in connection with FIGS. 3 and 4. Detailed descriptions of an example circuit for sparsity compression will be provided in connection with FIG. 5. Detailed descriptions of corresponding computer-implemented methods will also be provided in connection with FIG. 6.

FIG. 1 is a block diagram of an example system 100 for increasing cache capacity using sparsity compression. System 100 corresponds to a computing device, such as a desktop computer, a laptop computer, a server, a tablet device, a mobile device, a smartphone, a wearable device, an augmented reality device, a virtual reality device, a network device, and/or an electronic device. As illustrated in FIG. 1, system 100 includes one or more memory devices, such as memory 120. Memory 120 generally represents any type or form of volatile or non-volatile storage device or medium capable of storing data and/or computer-readable instructions. Examples of memory 120 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 1, example system 100 includes one or more physical processors, such as processor 110. Processor 110 generally represents any type or form of hardware-implemented processing unit capable of interpreting and/or executing computer-readable instructions. In some examples, processor 110 accesses and/or modifies data and/or instructions stored in memory 120. Examples of processor 110 include, without limitation, microprocessors, microcontrollers, Central Processing Units (CPUs), graphics processing units (GPUs), Field-Programmable Gate Arrays (FPGAs) that implement softcore processors, Application-Specific Integrated Circuits (ASICs), systems on chip (SoCs), digital signal processors (DSPs), Neural Network Engines (NNEs), accelerators, graphics processing units (GPUs), portions of one or more of the same, variations or combinations of one or more of the same, and/or any other suitable physical processor.

As further illustrated in FIG. 1, processor 110 includes a core 112, a cache 114, a compression circuit 150, a decompression circuit 160, and a controller 142. Core 112 corresponds to a processor core, although in other examples corresponds to a chiplet such as a chiplet of an accelerator. Cache 114 corresponds to a cache used by processor 110 (e.g., a client-side cache such as a low-level cache or L1 cache). In some examples, cache 114 corresponds to and/or includes other caches, such as a memory-side cache. Compression circuit 150 corresponds to a circuit for implementing a compression scheme and decompression circuit 160 corresponds to a circuit for implementing a corresponding decompression scheme. In some examples, compression circuit 150 and decompression circuit 160 can be the same or part of the same circuit. Further, in some examples, compression circuit 150 and/or decompression circuit 160 can be coupled to or otherwise part of cache 114. Controller 142 corresponds to a control circuit that controls aspects of cache 114. In some examples, compression circuit 150 and/or decompression circuit 160 can be part of controller 142.

Processor 110 reads and operates on instructions and/or data stored in memory 120. Because memory 120 is often slower than processor 110, memory access times create bottlenecks for processor 110. To alleviate this problem, processor 110 includes cache 114, which is typically a fast memory with access times less than that of memory 120, in part due to being physically located in processor 110.

Cache 114 holds data and/or instructions read from memory 120. Processor 110 (and/or core 112) first makes memory requests to cache 114. If cache 114 holds the requested data (e.g., a cache hit), processor 110 reads the data from cache 114 and avoids the memory access times of memory 120. If cache 114 does not hold the requested data (e.g., a cache miss), processor 110 retrieves the data from memory 120, incurring the memory access time. Although a larger cache size can reduce cache misses, considerations such as die size and power consumption limits the size of cache 114. Thus, to further reduce the need to access memory 120 on cache misses, processor 110 incorporates another cache (e.g., other intervening levels of caches in a cache hierarchy), that is larger but slower than cache 114, in a cache hierarchy.

Figure 2:
FIG. 2 is block diagram of an exemplary cache hierarchy.

FIG. 2 illustrates an example cache hierarchy in a system 200 which corresponds to system 100. System 200 includes one or more processors 210 which corresponds to processor 110 and one or more accelerators 211 which corresponds to processor 110. As illustrated in FIG. 2, processor 210 includes a core 212A which corresponds to core 112, a core 212B which corresponds to core 112, an L1 cache 214A which corresponds to cache 114, an L1 cache 214B which corresponds to cache 114, an L2 cache 216A which can correspond to cache 114, an L2 cache 216B which can correspond to cache 114, and an L3 cache 218 which can correspond to cache 114.

In the cache hierarchy of FIG. 2, level 1 (L1) corresponds to a lowest level of the hierarchy. L1 caches, such as L1 cache 214A and L1 cache 214B, can be implemented with a fast memory, such as static random-access memory (SRAM). To further prioritize speed, L1 caches can also be integrated with processor 210, for example within core 212A and core 212B respectively, which can improve latency and throughput. In some examples, as shown in FIG. 2, processor 210 includes multiple L1 caches.

L2 caches, such as L2 cache 216A and L2 cache 216B, are the next level in the cache hierarchy after L1 caches, which can be larger than and slower than L1 caches. Although integrated with processor 210, L2 caches can, in some examples, be located outside of a chip core, but can also be located on the same chip core package. L3 caches such as L3 cache 218 can be larger than L2 caches but can also be slower. In some examples, L3 caches can serve as a bridge to the main memory (e.g., memory 220). As such, L3 caches can be faster than the main memory. In some examples, multiple processors and/or cores can share an L3 cache, which can be located on the same chip core package or outside the package.

Memory 220 which corresponds to memory 120, stores instructions and/or data for processor 210 to read and use. Memory 220 can be implemented with dynamic random-access memory (DRAM). As shown in FIG. 2, the cache hierarchy further includes a memory cache 230 (e.g., a memory-side cache), and a data fabric 240 which corresponds to various structures, connections, and control circuits for sending data between memory and cache structures.

System 200 also includes one or more accelerators having a similar cache hierarchy. Accelerator 211 includes a chiplet 213A which corresponds to core 112, a chiplet 213B which corresponds to core 112, a chiplet 213C which corresponds to core 112, a chiplet 213D which corresponds to core 112, and an L2 cache 217 which corresponds to cache 114 that is shared by the chiplets.

As described herein, the physical sizes of cache structures can be limited by constraints (e.g., fabrication limits, heat consideration, etc.). However, certain workloads, such as workloads performed by accelerator 211, are amenable to compression. For example, accelerator workloads can exhibit sparsity (e.g., having zero values for data) such that accelerator 211 caches (e.g., in L2 cache 217 and/or memory cache 230) sparse data. Accordingly, the cached data can be compressed using a sparsity compression scheme such as zero value compression (ZVC) or other appropriate compression scheme.

Figure 3:
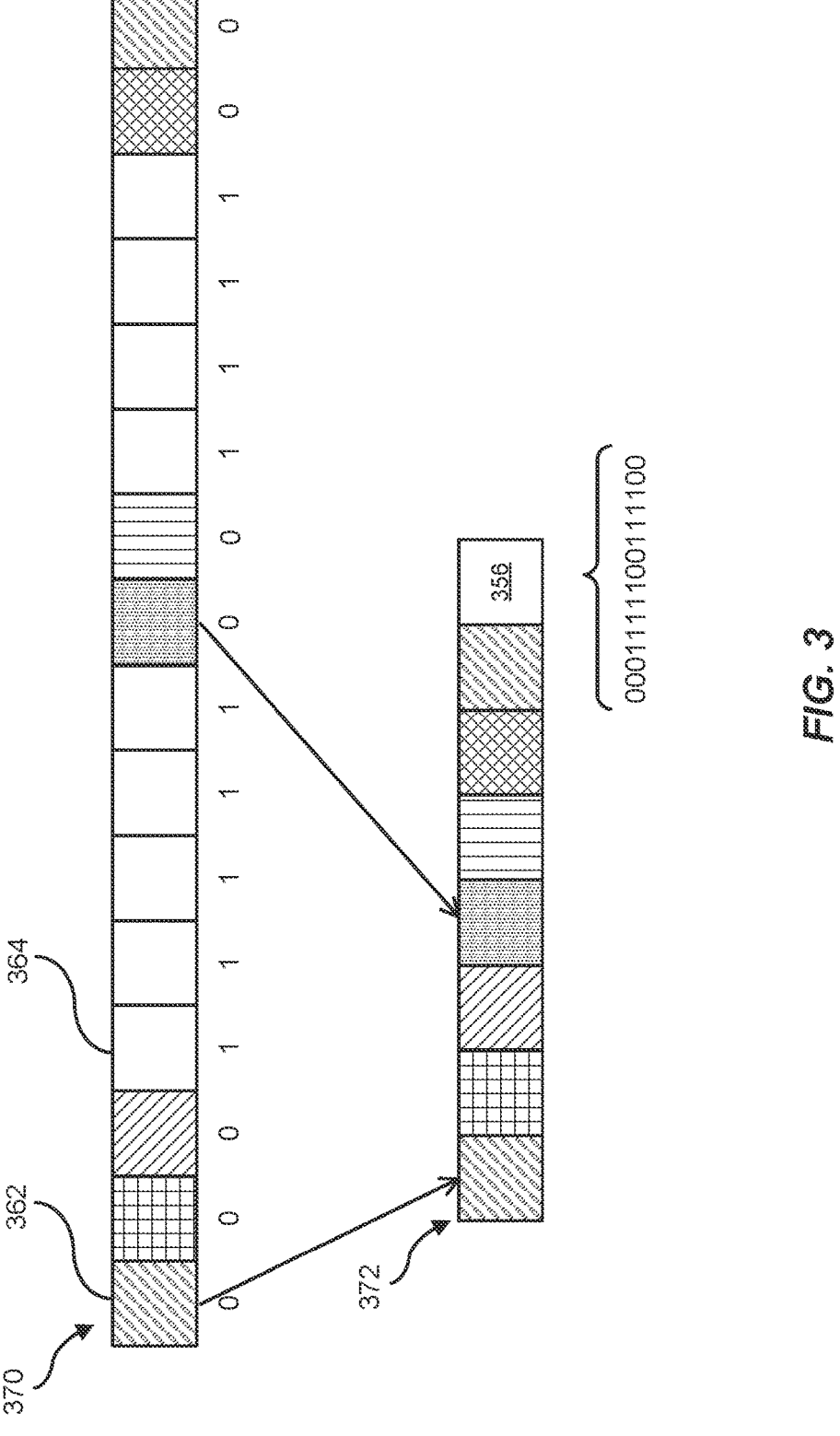
FIG. 3 is a diagram of an exemplary compression scheme.

FIG. 3 illustrates an example sparsity compression scheme 300 for compressing a data segment 370 into a compressed data segment 372. As illustrated in FIG. 3, data segment 370 includes various non-zero data units 362 (represented by shaded blocks) along with various zero-value data units 364 (represented by blank blocks). In FIG. 3, a data unit can correspond to a word or other data unit size.

In one example, data segment 370 can be compressed by removing all zero-value data units 364, and shifting together the remaining non-zero data units 362 together into a smaller data segment (e.g., compressed data segment 372) while maintaining the order of non-zero data units 362. For example, the first 3 data units of data segment 370 (e.g., the first 3 shaded blocks) are similarly placed as the first 3 data units of compressed data segment 372, as indicated by the first arrow. The next 5 data units (e.g., blank blocks) are skipped, and the next non-zero data units are placed into compressed data segment 372, as indicated by the second arrow. This process continues until the end of data segment 370. In some examples, a logic for shifting data units as described herein can be implemented that does not require a significant number of operations.

In order to subsequently decompress compressed data segment 372, a metadata 356 is stored with compressed data segment 372. In some examples metadata 356 is appended to an end of compressed data segment 372, although in other examples, metadata 356 can be stored in other locations, including separate from compressed data segment 372.

Metadata 356 includes information to allow restoring the removed zero-value data units 364. In some implementations, metadata 356 includes location or index information for zero-value data units 364. In FIG. 3, metadata 356 is a bitmask corresponding to data segment 370. More specifically, each bit in metadata 356 sequentially corresponds to a data unit in data segment 370 (see, e.g., the corresponding "0"s and "1"s for data segment 370 and metadata 356). In FIG. 3, a "0" corresponds to a non-zero data unit, and a "1" corresponds to a zero-value data unit. Accordingly, metadata

356 includes the locations for zero-value data units 364, as represented by "1"s. In other examples, other indexing schemes can be used, such as reversing "0" and "1."

In some implementations, a desired compression ratio, such as 2:1, is required for increasing cache capacity. For instance, a 2:1 compression ratio allows 2 compressed data segments to be stored in the same physical space as 1 uncompressed data segment. With the 2:1 compression ratio, cache 114 can effectively double in capacity, by storing two compressed data segments in the space for one data segment. Achieving the desired compression ratio requires a minimum number of zero-value data units 364 in data segment 370. In addition, the compression can require enough compression to also store metadata 356. For example in FIG. 3, data segment 370 includes 16 data units, which have been compressed into 8 data units (e.g., 7 data units for data and 1 metadata unit) in compressed data segment 372 to achieve a 2:1 compression. In other examples, a minimum number of zero-value data units 364 can depend on a total size of data segment 370, a data unit size, a desired compression ratio, etc. In addition, in some examples, compression can be skipped if the desired compression ratio is not achievable (e.g., the minimum number of zero-value data units is not met).

Figure 4:
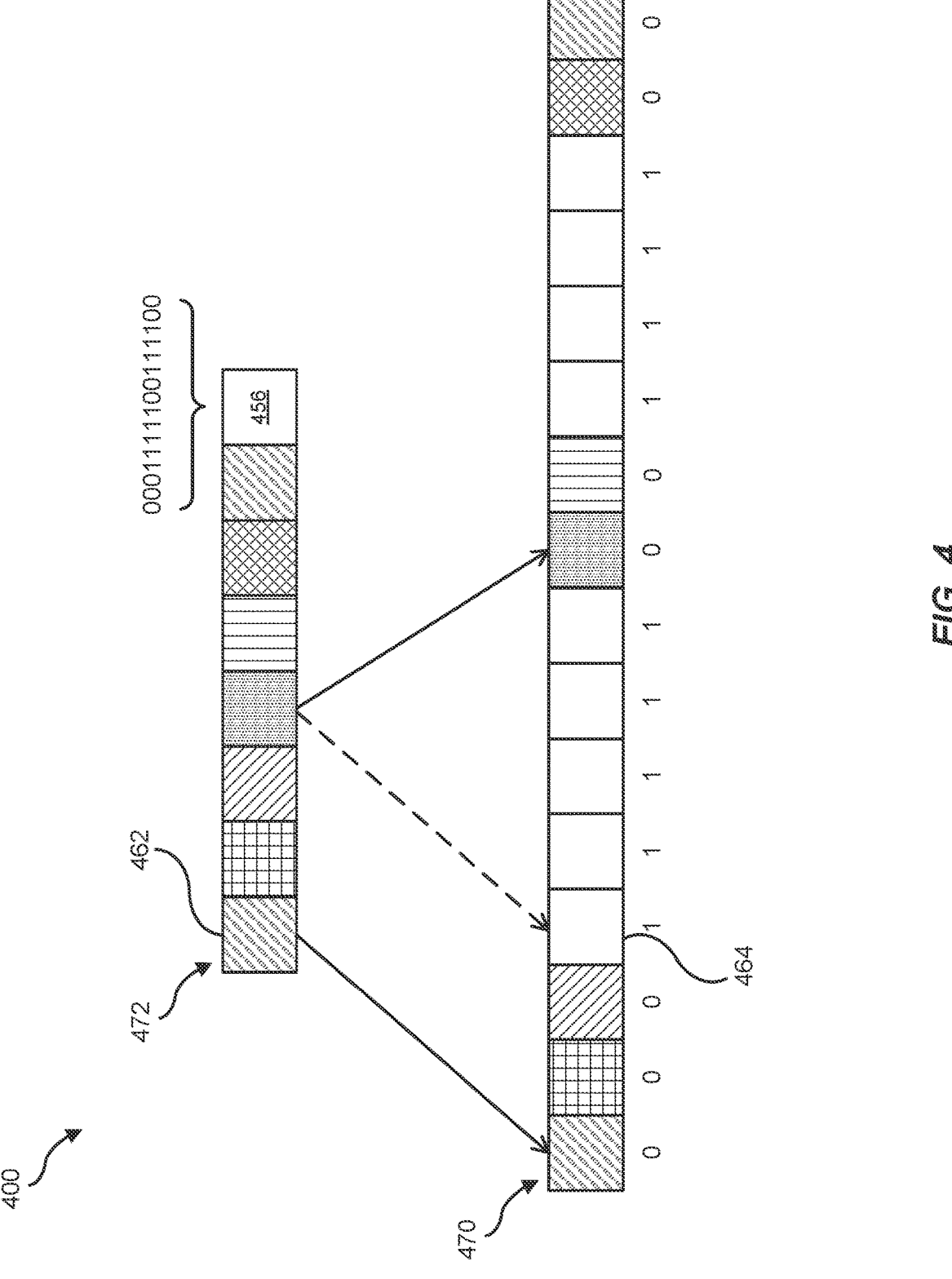
FIG. 4 is a diagram of a corresponding decompression scheme.

FIG. 4 illustrates an example sparsity decompression scheme 400, corresponding to sparsity compression scheme 300, for decompressing a compressed data segment 472 (corresponding to compressed data segment 372) into a data segment 470 (corresponding to data segment 370).

Decompressing compressed data segment 472 can require identifying the locations of zero-value data units 464 with respect to non-zero data units 462. In some implementations, parsing a metadata 456 (corresponding to metadata 356) provides the location or index information. More specifically, in FIG. 4, applying the bitmask of metadata 456 can provide the index information. For each data unit in data segment 470, the corresponding bit in metadata 456 indicates whether the data unit corresponds to a non-zero value (e.g., the next non-zero data unit 462 from compressed data segment 472) or a zero value (e.g., zero-value data unit 464).

In FIG. 4, the first 3 data units have "0" bits, indicating that the first 3 non-zero data units of compressed data segment 472 can be placed, as indicated by the first arrow. However, the fourth block has a bit "1" indicating a zero value. Thus, the fourth data unit from compressed data segment 472 is shifted (e.g., shifted 5 blocks) until the next "0" bit, as indicated by the dotted arrow and the second arrow. Continuing this process, data segment 470 can be rebuilt from compressed data segment 472.

Figure 5:
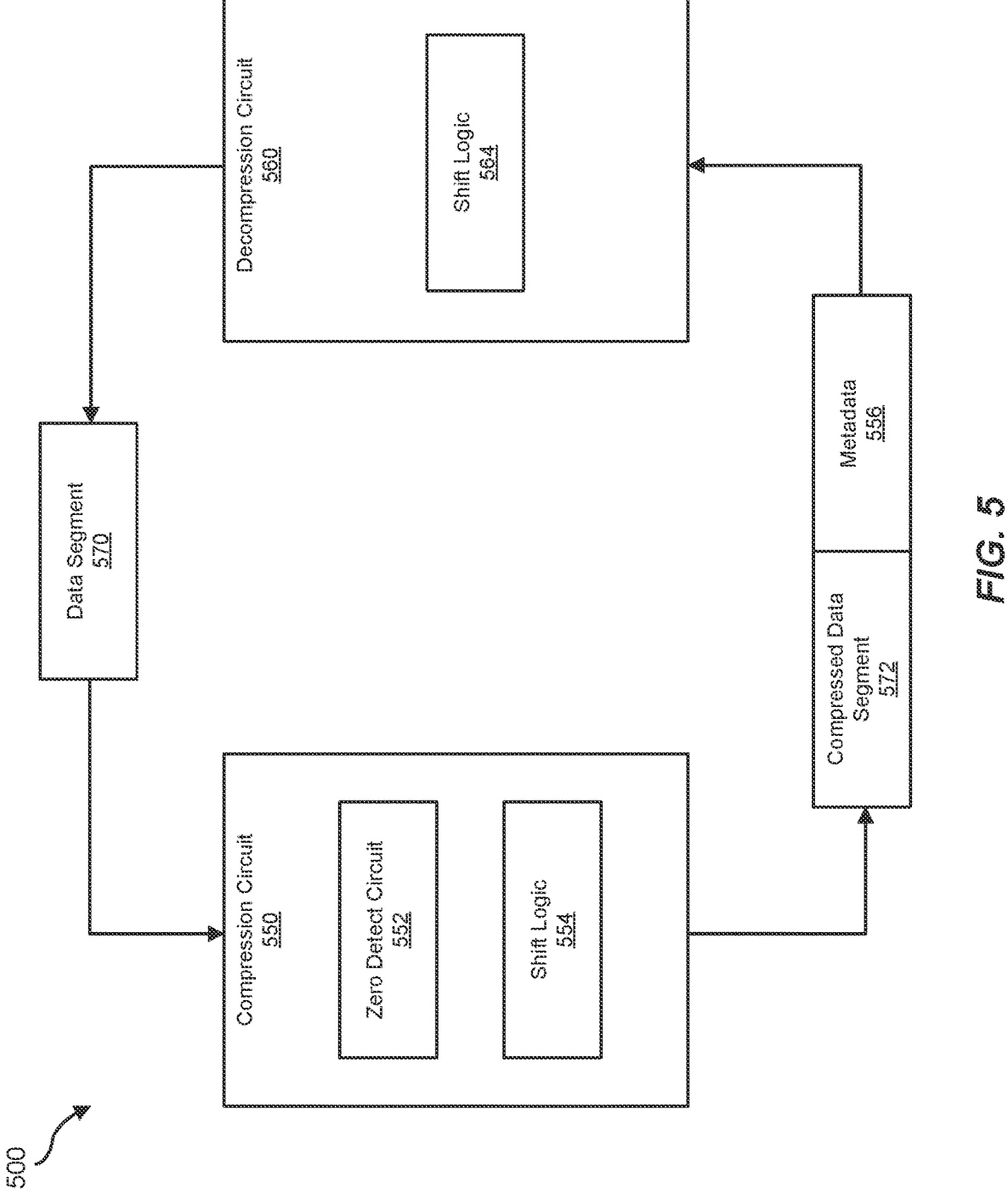
FIG. 5 is a simplified block diagram of an exemplary circuit for compression.

FIG. 5 illustrates an example circuit 500 that can perform a sparsity compression, such as sparsity compression scheme 300 and sparsity decompression scheme 400. Circuit 500 includes a compression circuit 550 (corresponding to compression circuit 150) and a decompression circuit 560 (corresponding to decompression circuit 160), and further operates on a data segment 570 (corresponding to data segment 370 and/or data segment 470) and a compressed data segment 572 (corresponding to compressed data segment 372 and/or compressed data segment 472) with a metadata 556 (corresponding to metadata 356 and/or metadata 456). Compression circuit 550 further includes a zero detect circuit 552 (e.g., a circuit configured to detect zero values and/or locations of zero values) and a shift logic 554 (e.g., a circuit for shifting data values). Decompression circuit 560 includes a shift logic 564.

Compression circuit 550 can perform a compression scheme, such as sparsity compression scheme 300, on data segment 570. For example, zero detect circuit 552 can detect the locations of the zero-value data units of data segment 570 and build metadata 556 as described herein. Shift logic 554 can shift together the non-zero data units of data segment 570 to build compressed data segment 572 as described herein.

Decompression circuit 560 can perform a decompression scheme, such as sparsity decompression scheme 400, on compressed data segment 572. For example, shift logic 564 can use metadata 556 to rebuild data segment 570 from compressed data segment 572 by shifting non-zero data units from the locations of zero-value data units as described herein.

In some examples, circuit 500 and/or components thereof can be part of a cache (e.g., cache 114) and/or controller (e.g., controller 142). In other examples, circuit 500 and/or components thereof can be separate from the cache and/or controller.

Figure 6:
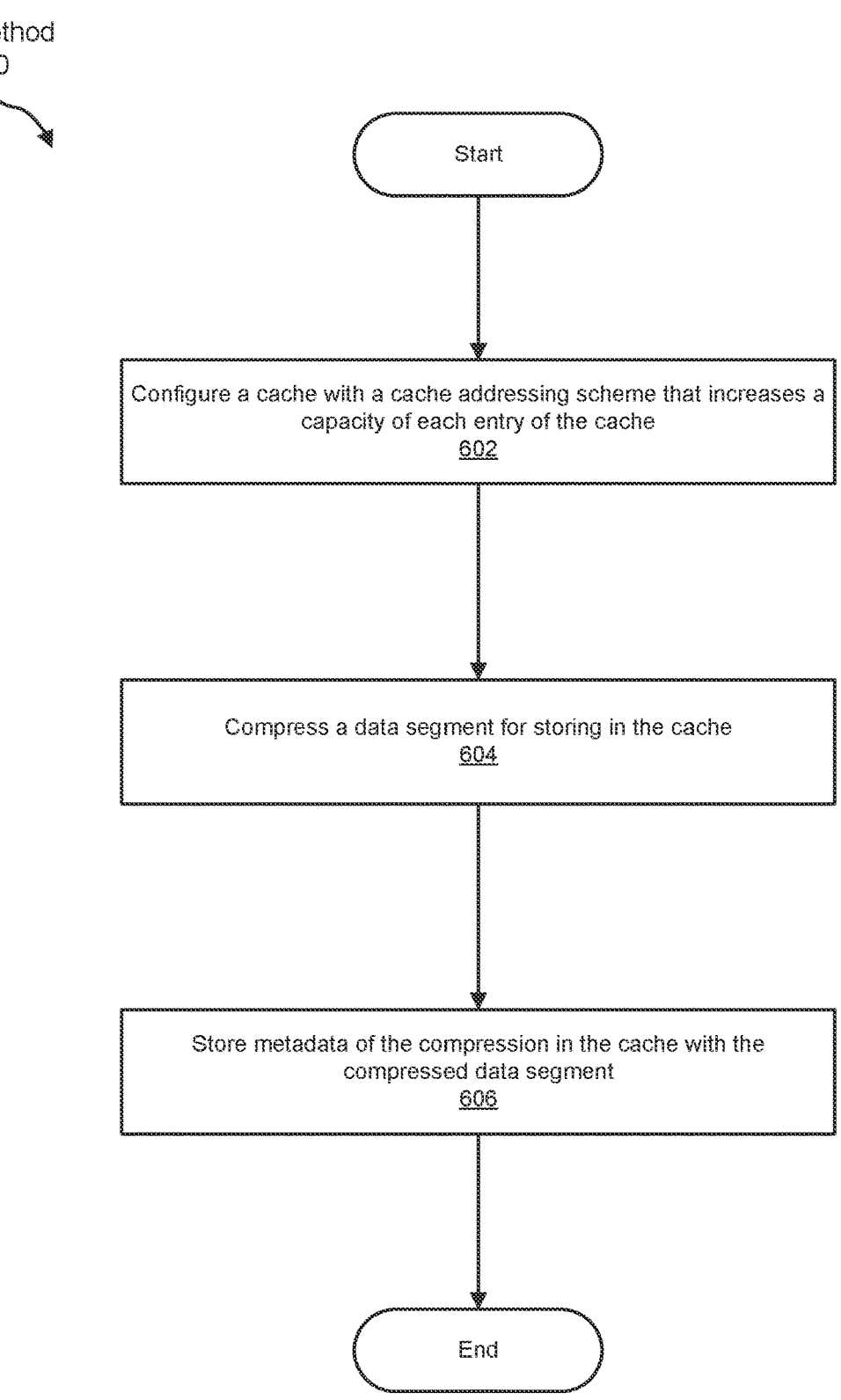
FIG. 6 is a flow diagram of an exemplary method for sparsity compression for increased cache capacity.

FIG. 6 is a flow diagram of an exemplary computer-implemented method 600 for increasing cache capacity with sparsity compression. The steps shown in FIG. 6 can be performed by any suitable computer-executable code and/or computing system, including the system(s) illustrated in FIGS. 1, 2, and/or 5. In one example, each of the steps shown in FIG. 6 represent an algorithm whose structure includes and/or is represented by multiple sub-steps, examples of which will be provided in greater detail below.

As illustrated in FIG. 6, at step 602 one or more of the systems described herein configures a cache with a cache addressing scheme that increases a capacity of each entry of the cache. For example, controller 142 configures cache 114 with an addressing scheme that increases a capacity of each entry of cache 114.

The systems described herein can perform step 602 in a variety of ways. In one example, the cache addressing scheme includes hashing one or more address bits to increase a number of addresses represented by each entry of the cache. For instance, the address bits correspond to upper address bits. Additionally, in some implementations, the cache addressing scheme includes reconfiguring a shadow tag indexing scheme for the cache, such as to account for the increased number of addresses.

At step 604 one or more of the systems described herein compresses a data segment for storing in the cache. For example, controller 142 and/or compression circuit 150 compresses a data segment for storing in cache 114.

The systems described herein can perform step 604 in a variety of ways. In one example, compressing the data segment further comprises shifting non-zero values together, as further described herein.

At step 606 one or more of the systems described herein stores metadata of the compression in the cache with the compressed data segment. For example, compression circuit 150 and/or controller 142 stores metadata of the compression in cache 114 with the compressed data segment.

The systems described herein can perform step 606 in a variety of ways. In one example, the metadata represents index locations for zero values in the data segment, as described herein. For instance, the metadata comprises a bitmask of the index locations. Moreover, in some implementations the metadata is appended to the compressed data segment for storing in the cache.

In some implementations, the method further includes decompressing, using the metadata, the compressed data segment for reading. For example, decompression circuit 160 and/or controller 142 can decompress the compressed data segment using the metadata. In some examples, decompressing the compressed data segment further includes applying the metadata to shift non-zero values in the compressed data segment to locations corresponding to the data segment prior to compression, as described herein.

As detailed above, the present disclosure is directed to increasing cache capacity by compressing data. Certain workloads, such as machine learning workloads, tend to be sparse (e.g., having a lot of zero values). Applying a compression scheme such as zero value compression (ZVC) can effectively double the cache capacity. Implementing ZVC includes using a bitmask for each cache line corresponding to zero value locations, and a shift logic to shift values based on the bitmask. An addressing scheme is updated to use the added capacity.

As detailed above, the computing devices and systems described and/or illustrated herein broadly represent any type or form of computing device or system capable of executing computer-readable instructions, such as those contained within the modules described herein. In their most basic configuration, these computing device(s) each include at least one memory device and at least one physical processor.

In some examples, the term "memory device" generally refers to any type or form of volatile or non-volatile storage device or medium capable of storing data and/or computer-readable instructions. In one example, a memory device stores, loads, and/or maintains one or more of the modules and/or circuits described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor accesses and/or modifies one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), systems on a chip (SoCs), digital signal processors (DSPs), Neural Network Engines (NNEs), accelerators, graphics processing units (GPUs), portions of one or more of the same, variations or combinations of one or more of the same, or any other suitable physical processor.

In some implementations, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device comprising:
a cache; and
a controller configured to:
    configure a cache with a cache addressing scheme that allows storing multiple compressed entries into an entry of the cache corresponding to an uncompressed entry size;
    compress a data segment for storing in the cache; and
    store, as one of the multiple compressed entries in the entry of the cache, the compressed data segment with metadata of the compression appended to an end of the compressed data segment, wherein the metadata represents index locations within the data segment at which zero values appeared in the data segment prior to compression.

2. The device of claim 1, wherein compressing the data segment further comprises shifting non-zero values together.

3. The device of claim 1, wherein the metadata comprises a bitmask of the index locations.

4. The device of claim 1, wherein the cache addressing scheme includes hashing one or more address bits of an address for the entry of the cache to map the entry to the multiple compressed entries.

5. The device of claim 4, wherein the address bits correspond to upper address bits.

6. The device of claim 1, wherein the cache addressing scheme includes reconfiguring a shadow tag indexing scheme for the cache.

7. The device of claim 1, wherein the controller is further configured to decompress, using the metadata, the compressed data segment for reading.

8. The device of claim 7, wherein decompressing the compressed data segment further comprises applying the metadata to shift non-zero values in the compressed data segment to locations corresponding to the data segment prior to compression.

9. A system comprising:
a cache;
a compression circuit; and
a controller configured to:

configure the cache with a cache addressing scheme that allows storing multiple compressed entries into an entry of the cache correspond to an uncompressed entry size;
    compress, using the compression circuit, a data segment for storing in the cache;
    append metadata of the compression to an end of the compressed data segment, wherein the metadata represents index locations within the data segment at which zero values appeared in the data segment prior to compression; and
    store the compressed data segment and the metadata as one of the multiple compressed entries in the cache entry based on the cache addressing scheme.

10. The system of claim 9, wherein the compression circuit comprises a zero detect circuit and a shift logic.

11. The system of claim 10, wherein compressing the data segment further comprises:
    detecting, using the zero detect circuit, the index locations for zero values in the data segment;
    saving, as a bitmask, the index locations as the metadata; and
    shifting, using the shift logic, non-zero values together.

12. The system of claim 9, wherein the cache addressing scheme comprises:
    hashing one or more upper address bits of an address for the entry of the cache to map the entry to the multiple compressed entries; and
    reconfiguring a shadow tag indexing scheme for the cache in accordance with the cache addressing scheme.

13. The system of claim 9, wherein the controller is further configured to decompress, by applying the metadata to shift non-zero values in the compressed data segment to locations corresponding to the data segment prior to compression, the compressed data segment for reading.

14. A method comprising:
    configuring a cache with a cache addressing scheme that allows storing multiple compressed entries into an entry of the cache corresponding to an uncompressed entry size;
    compressing, using a compression circuit, a data segment for storing in the cache;
    storing, as one of the multiple compressed entries in the entry of the cache based on the cache addressing scheme, the compressed data segment with metadata of the compression appended to an end of the compressed data segment, wherein the metadata represents index locations within the data segment at which zero values appeared in the data segment prior to compression; and
    decompressing, using a decompression circuit, the compressed data segment for reading the data segment.

15. The method of claim 14, wherein:
    the compression circuit comprises a zero detect circuit and a first shift logic, and the decompression circuit comprises a second shift logic;
    compressing the data segment further comprises shifting, using the first shift logic, nonzero values together; and
    decompressing the compressed data segment further comprises applying the metadata to shift, using the second shift logic, non-zero values in the compressed data segment to locations corresponding to the data segment prior to compression.

16. The method of claim 15, wherein the metadata comprises a bitmask of the index locations detected by the zero detect circuit for zero values in the data segment.

17. The method of claim 14, wherein the cache addressing scheme comprises:

hashing one or more upper address bits of an address for the entry of the cache to map the entry to the multiple compressed entries; and reconfiguring a shadow tag indexing scheme for the cache based on the cache addressing scheme.

18. The device of claim 1, wherein the controller is further configured to:

determine a compression ratio for compressing the data segment;

compare the determined compression ratio with a desired compression ratio that is based on a metadata unit size; and forego compressing the data segment in response to the determined compression ratio not achieving the desired compression ratio.

19. The device of claim 1, wherein the controller is further configured to:

compress a second data segment for storing in the cache; and store, as a second compressed entry of the multiple compressed entries in the entry of the cache, the compressed second data segment.

* * * * *